United States Patent
Muehlpforte et al.

[11] Patent Number: 5,878,631
[45] Date of Patent: Mar. 9, 1999

[54] WIPER DEVICE

[75] Inventors: Kurt Muehlpforte; Henk Becker; Claus Fleischer, all of Buehl; Tino Boos, Baden-Baden, all of Germany

[73] Assignee: Robert Bosch GmbH, Stuttgart, Germany

[21] Appl. No.: 806,260

[22] Filed: Feb. 21, 1997

[30] Foreign Application Priority Data

Mar. 26, 1996 [DE] Germany ............... 196 11 919.7
Oct. 16, 1996 [DE] Germany ............... 196 42 667.7

[51] Int. Cl.$^6$ ................ A47L 1/02; F16H 57/02
[52] U.S. Cl. ............... 74/606 R; 15/250.3; 15/250.31; 296/96.17
[58] Field of Search .................. 74/42, 606 R; 15/250.27, 250.3, 250.31; 296/96.17

[56] References Cited

U.S. PATENT DOCUMENTS

| | | | |
|---|---|---|---|
| 1,998,760 | 4/1935 | Hueber | 15/250.31 |
| 5,074,613 | 12/1991 | Unterborn et al. | 15/250.31 |
| 5,142,941 | 9/1992 | Amann et al. | 15/250.3 X |
| 5,222,706 | 6/1993 | Hoshino | 15/250.31 |
| 5,396,681 | 3/1995 | Hara | 15/250.31 |
| 5,441,227 | 8/1995 | Hayashi | 15/250.31 X |
| 5,647,086 | 7/1997 | Gold | 15/250.31 |

*Primary Examiner*—Allan D. Herrman
*Attorney, Agent, or Firm*—Michael J. Striker

[57] ABSTRACT

A wiper device has a tubular plate and a wiper drive mounted on the tubular plate and having a drive shaft guided in a bearing support. The wiper drive with the bearing support is inserted in a tubular element arranged on the tubular plate.

19 Claims, 7 Drawing Sheets

WIPER DEVICE

BACKGROUND OF THE INVENTION

The present invention relates to a wiper device for motor vehicles.

Wiper devices, in particular for motor vehicles, are fixed with a tubular plate on a chassis of the motor vehicle. A wiper drive is mounted on the tubular plate, and its drive shaft through a transmission drives driven shafts which are supported in a wiper bearing, extend outwardly of the chassis of the vehicle and plugged on its wiper.

The wiper drive includes a motor and a transmission, from which a bearing member guides the drive shaft and extends in a bearing support. The wiper drive must be fixed in an axial direction and in a peripheral direction, so that the reaction forces of the torque to be transmitted can be taken up.

A support for the wiper drive is known in the prior art, in which three screw domes arranged on the bearing member of the transmission are located around the bearing support and have an inner thread for screwing the wiper drive with a receiving plate. Thereby a substantial distance between the center of gravity of the wiper drive and the receiving plate is provided. For suppressing the moments and vibrations produced in this way, the receiving plate, the bearing member and the mounting elements must be correspondingly thick and heavy. Furthermore, the known tubular plate for receiving the wiper drive can be composed of numerous components. This makes expensive their mounting and manufacture.

SUMMARY OF THE INVENTION

Accordingly, it is an object of present invention to provide a wiper drive which avoids the disadvantages of the prior art.

In keeping with these objects and with others which will become apparent hereinafter, one feature of the present invention resides, briefly stated, in a wiper drive which has a tubular plate, a wiper drive with a drive shaft guided in a bearing support mounted on the tubular plate, wherein in accordance with the present invention the wiper drive with the bearing support is inserted in a tubular element arranged on the tubular plate.

When the wiper drive is designed in accordance with the present invention it has the advantage that the distance between the center of gravity of the wiper drive and the receptacle of it is reduced by the insertion of the bearing support into the tubular element. A compact, deformation-strong, bending-resistant and simultaneously light bearing is produced. The bearing support required for the support of the drive shaft can be additionally used in a favorable manner for the bearing of the wiper drive. When the tubular element is formed on the tubular plate, for example by casting of the tubular plate by an inner high pressure process or a singular process, additional components and mounting expenses are dispensed with. In particular, with the use of the inner high pressure process, high weight economy can be obtained by hollow, relatively thinwalled molded parts. The tubular element can be welded however on the tubular plate.

When the tubular element is molded on the tubular plate and the bearing support of the transmission is inserted through the tubular plate, the smallest possible supporting distance to the tubular plate in an axial direction of the drive shaft and perpendicular to it is provided.

When the tubular element has an opening which is throughgoing in an axial direction and is substantially closed with a great supporting surface, a force-transmission with relatively low specific stresses is sufficient for fixing the bearing support of the wiper drive in a peripheral direction and/or in an axial direction. This can be obtained for example by an oversize fit, a clamping connection or a suitable joining technique, with which the bearing support is force-transmittingly inserted in the tubular element.

When the tubular element does not have closed tubular surfaces in an axial direction, but instead has a supporting collar with small supporting surfaces above and below, as produced during the manufacture with an inner high pressure process, a durable force-transmission with reliable specific stresses no longer can be obtained, since the supporting surfaces and cross-sections are too small. Advantageously, then the bearing support and the tubular element is fixed in the peripheral direction by a form-locking connection or a combined form-locking and force-transmitting connection.

The tubular plate with the tubular element formed on it, in which the bearing support is formed-lockingly fixed in the peripheral direction combines the advantages of a very light construction with a reduction of components and separation points.

It is advantageous when the form-locking connection is produced in a peripheral direction between the bearing support and the tubular element by an inner contour which deviates from the circular shape, in particular a polygonal or similar regular or irregular non-round inner contour, for example an ellipsoidal contour of the tubular element, and a corresponding outer contour of the bearing support. A corresponding outer contour can abut in a form-locking manner against the inner contour either over the whole periphery or only in partial regions of its periphery.

A further inventive design resides in that, the form-locking connection is obtained by a toothing between the bearing support and the tubular element.

When the contour between the bearing support and the tubular element is conical in a longitudinal direction, the insertion process is facilitated in the beginning, since a smaller outer dimension of the bearing pin meets a greater inner diameter of the tubular element. At the end of the mounting process the both parts coincide by their adjoining surfaces with one another. This facilitates the mounting process, in particular for tubular surfaces with substantial axial distance and form-locking connection. Additionally, a pre-tensioning can be produced. In accordance with the present invention, this effect can be achieved by a stepped contour between the bearing support and the tubular element. With a conical or stepped contour and the supporting surfaces with an axial distance, a form-locking can be obtained by the supporting surfaces which deviate from the circular shape, for example the inner contour of the tubular element, and the corresponding outer contour of the bearing support.

In a further embodiment of the present invention, the tubular element is calibrated with a mandrel before the mounting. The mandrel can be profiled, for example it can be provided with a toothing. Therefore a surface is produced, with which a correspondingly designed outer contour of the bearing support forms a form-locking or force-transmitting fixed connection.

The wiper drive in accordance with the present invention is fixed in an axial direction by at least one bracket which at least partially surrounds the tubular plate. It can be formed as a steel bracket, a synthetic plastic bracket, or as a bracket spring mounted on the wiper drive, for example on the transmission. It can also surround the same completely. The bracket can be engaged by the tubular plate or by a loop mounted on the tubular plate. Preferably two brackets are utilized, in particular a left bracket and a right bracket in addition to the bearing support, for providing a symmetrical support. The brackets can be additionally used for an axial and a radial fixation which, in combination with a further device can be used for example for a force-transmitting connection or a form-locking connection.

In accordance with a further variant of the invention, the wiper drive can be screwed by at least one screw through the tubular plate with the latter and thereby fixed axially. A simple and efficient construction is produced in this way, which can take up forces in a peripheral direction as well.

It is further proposed to fix the bearing support in the tubular element in an axial direction in a form-locking manner. Thereby an axial securing can be obtained with a low mounting space and a low number of additional parts.

In accordance with the present invention, this can be obtained by a securing ring. Preferably, the bearing support and the tubular element is tensioned with a spring, for example a plate spring relative to one another, so as to prevent undesired gap. A second possibility resides in that, a sleeve nut can be screwed from above on the bearing support and supported on the tubular element so as to press the bearing support from below into the tubular element. A third embodiment is provided in that the bearing support is fixed by a deformation of the tubular element, for example by providing a nut on the bearing support and pressing it into the tubular element.

Preferably, the connection between the tubular element and the bearing support of at least one further mounting point of the wiper device is used on an adjoining component, for example on the chassis of the motor vehicle. In this case, additional required components are used for two functions, without a substantially greater mounting space.

When at least one mounting point of the wiper device is integrated on an adjoining component of the wiper drive, simultaneously the relatively heavy wiper drive is directly fixed on the adjoining component. Possible occurring moments which are produced when the wiper drive is mounted through the tubular plate on the adjoining component, are dispensed with.

The novel features which are considered as characteristic for the present invention are set forth in particular in the appended claims. The invention itself, however, both as to its construction and its method of operation together with additional objects and advantages thereof, will be best understood from the following description of specific embodiments when read in connection with the accompanying drawings.

DESCRIPTION OF PREFERRED EMBODIMENTS

Figure 1:
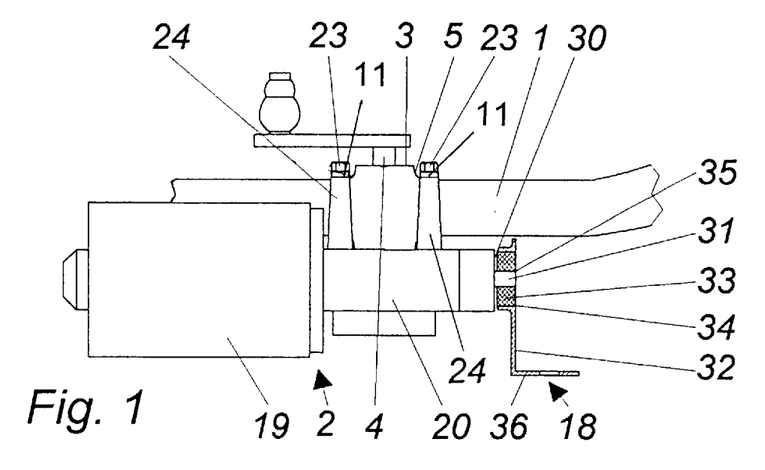
FIG. 1 is a view showing a wiper drive in accordance with the invention fixed by a bracket.
Figure 13:
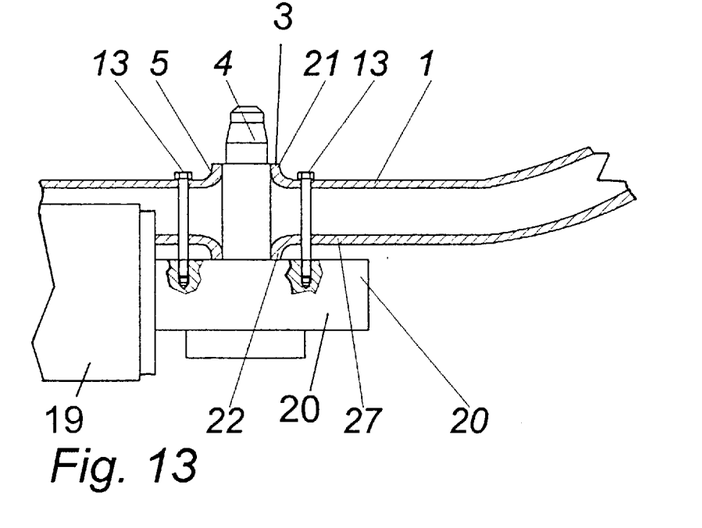
FIG. 13 is a view showing a wiper drive fixed with screws.

FIG. 1 shows a tubular plate 1 on which a tubular element 5 is formed. The tubular element is composed of an upper ring-shaped collar 21 and a lower ring-shaped collar 22, as can be seen in FIG. 13. It can be formed or welded by an inner high-pressure process, a casting process, etc. A wiper drive 9 is arranged on the ring-shaped element 5. The wiper drive 2 includes a motor 19 and a transmission 20. A drive shaft 4 which is guided in a bearing support 3 extends from the transmission 20. The wiper drive 2 is inserted with its bearing support 3 into the tubular element 5, and therefore the supporting distance between the wiper drive 2 and the tubular plate 1 is very small.

Figure 3:
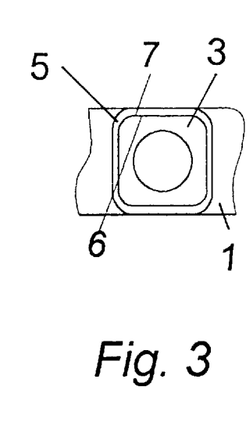
FIG. 3–8 are views showing outer and inner contours of a bearing support and a tubular element.
Figure 4:
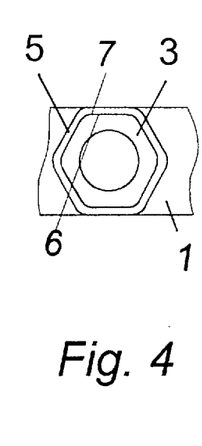
Figure 5:
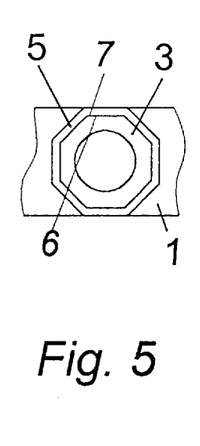
Figure 6:
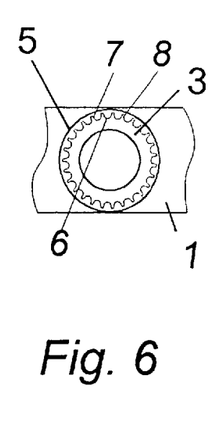
Figure 7:
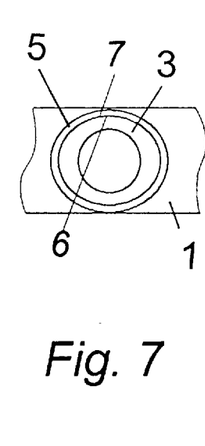
Figure 8:
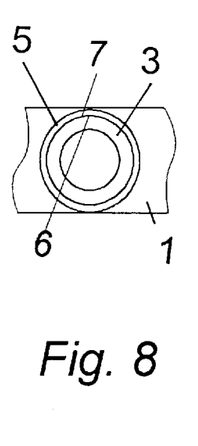

In accordance with the present invention, the bearing support 3 is fixed in a peripheral direction by a form-locking connection. In particular, the tubular element 5 has an inner contour 6 which deviates from a circular form and in particular is polygonal or the like, and the bearing support 3 has a corresponding outer contour 7. The inner contour 6 and the outer contour 7 having a rectangular shape is shown in FIG. 3, a hexagonal shape in FIG. 4, and an octagonal shape in FIG. 5. Basically, all polygonal shapes are possible. FIG. 6 shows an inner contour 6 and an outer contour 7 which engage with one another through a toothing 8 in a form-locking manner. FIG. 7 shows a non-round, for example ellipsoidal inner contour 6 of the tubular element 5 and a corresponding outer contour 7 of the bearing support 3. Basically, a round inner contour 6 and outer contour 7 is also possible, as shown in FIG. 6. The fixation in a peripheral direction can be performed by a force-transmitting connection, by a material lock, by a form-locking connection with an additional component, or by a combination of the above described methods.

Figure 9:
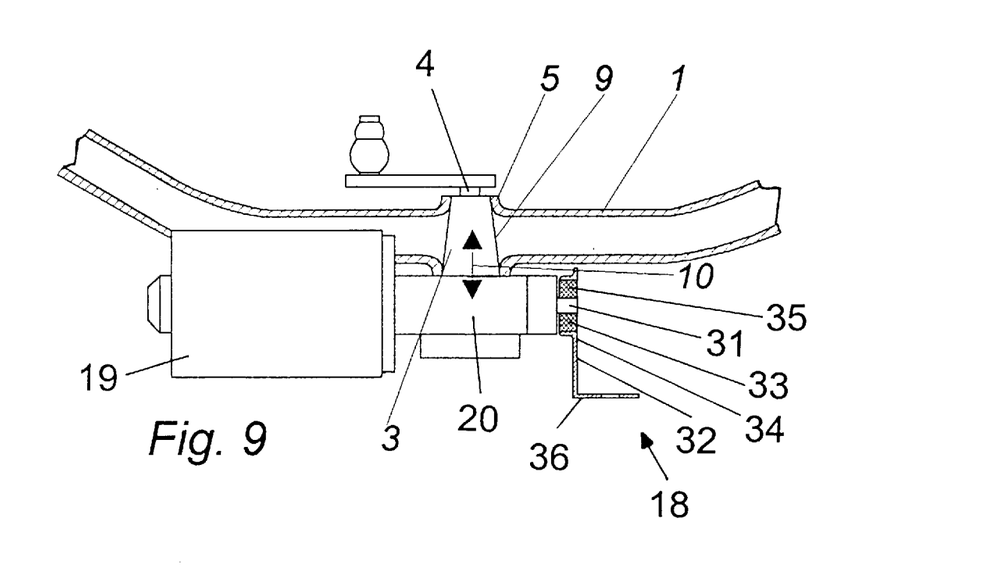
FIG. 9 is a view showing a conial contour between a tubular element and a bearing support.
Figure 10:
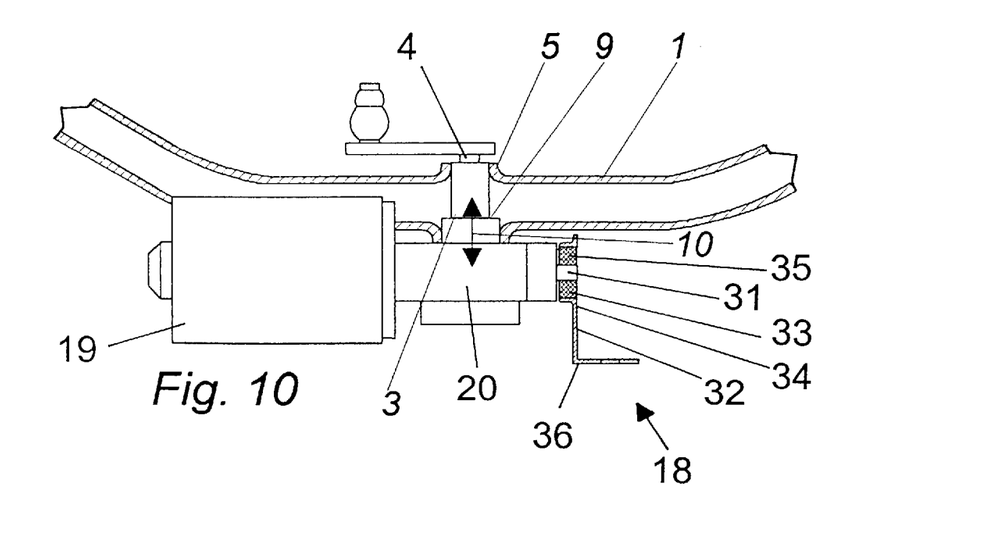
FIG. 10 is a view showing a stepped contour between a tubular element and a bearing support.

FIG. 9 shows a bearing support 3 and a tubular element 5 which have a conical contour 9 in a longitudinal direction 10. Thereby the insertion process is facilitated, since first of all the upper small outer diameter of the bearing support 3 meets the lower greater inner diameter of the tubular element 5 and only at the end of the mounting process the adjoining surfaces meet one another. The same effect is obtained when the contour in the longitudinal direction is stepped, as shown in FIG. 10.

Figure 2:
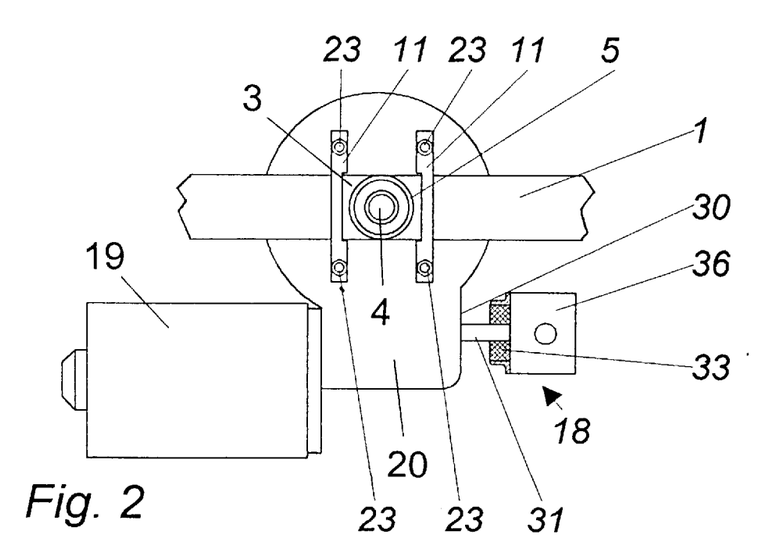
FIG. 2 is a view plan of the invention wiper drive shown in FIG. 1.

The wiper drive 2 in accordance with the present invention is fixed in the axial direction 10 with at least one bracket 11 which at least partially surrounds the tubular plate 1. FIGS. 1 and 2 show one embodiment. The wiper drive 2 is clamped by two symmetrical brackets 11 with the tubular plate 1, located symmetrically at the left side and at the right side near the bearing support 3 and mounted by two screws 23 on two threaded supports 24. The threaded supports 24 are welded or molded on the transmission 20. The brackets 11 completely surround the tubular plate 1.

Figure 11:
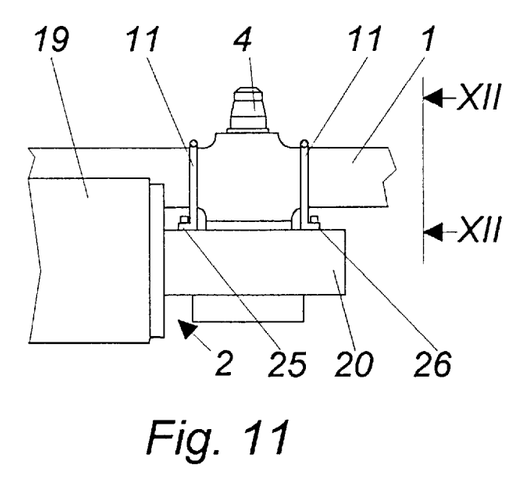
FIG. 11 is a view showing a wiper drive fixed by a bracket spring.
Figure 12:
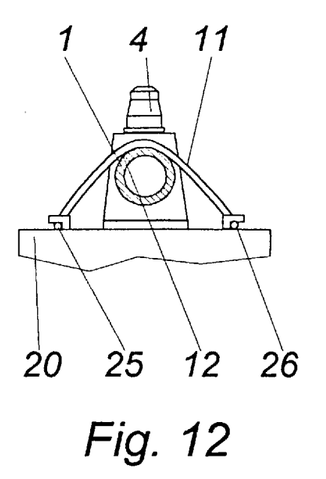
FIG. 12 is a view as seen along the line XII—XII in FIG. 11.
Figure 14:
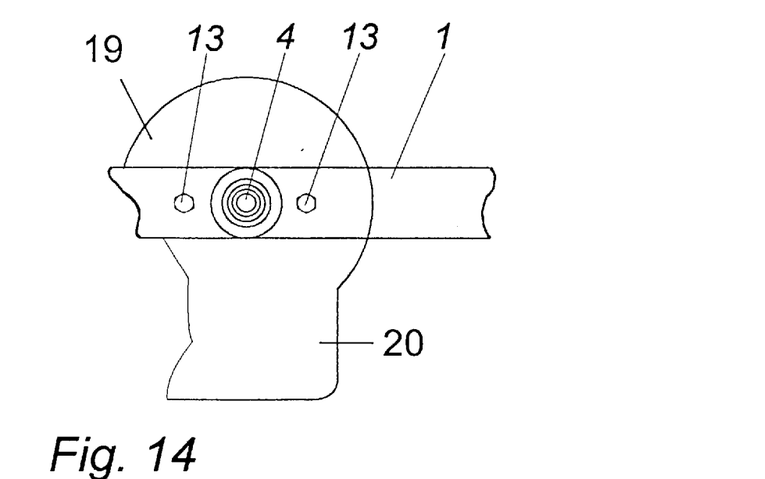
FIG. 14 is a plan view of the wiper drive shown in FIG. 13.

FIGS. 11 and 12 show a further variant of two bracket springs 11. The bracket springs 11 are mounted with their ends 25, 26 on the transmission and behind the tubular plate 1 and completely surround the same. In the shown embodiment, two bracket springs 11 are tensioned at the left side and at the right side near the drive shaft 4. The brackets 11 must surround the tubular plate 1 not completely, but instead they engage through the same or through shackles arranged on the tubular plate 1. In accordance with a further embodiment shown in FIGS. 13 and 14, the tubular plate 1 is screwed by at least one screw 13 with the transmission 20. Preferably, two screws 13 are arranged symmetrically at the left side and at the right side near the drive shaft 4. They can be engaged completely by the tubular plate 1 as not shown, or by the lower part 27 of the tubular plate 1.

Figure 15:
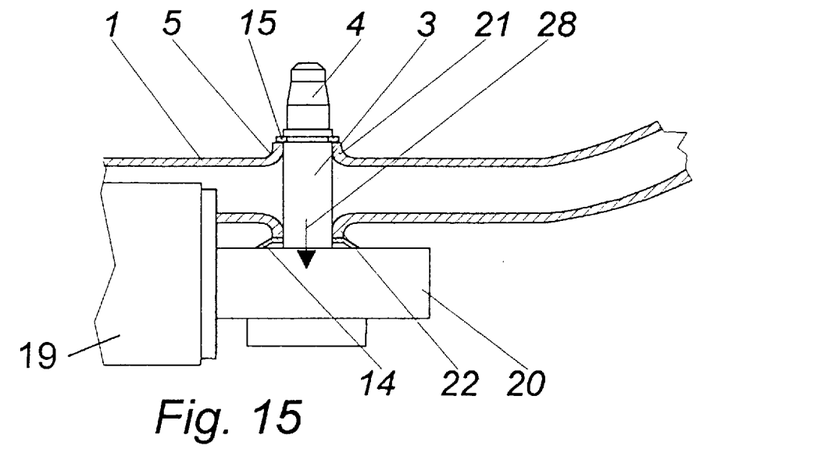
FIG. 15 is a view showing a wiper drive fixed with a safety ring and a spring.

In one embodiment of the invention, the bearing support 3 is fixed in the tubular element 5 in the axial direction 10 with a safety ring 15 or a similar securing element, for example a socalled speed nut, in a form-locking manner. Preferably, the bearing support 3 is pre-tensioned against the tubular element 5 with a spring 14 in an axial direction 10. In the embodiment shown in FIG. 15, a plate spring 14 is plugged on the bearing support 3. After the insertion of the bearing support 3 into the tubular element 5 it is located between the lower ring-shaped collar 22 and the transmission 20 and produces a force 28 which is directed downwardly from the tubular element 5 on the bearing tube 3. The movement of the bearing tube 3 from the ring-shaped element 5 is prevented by a safety ring 15 arranged above on the bearing support 3 and supported on the upper collar 21.

Figure 16:
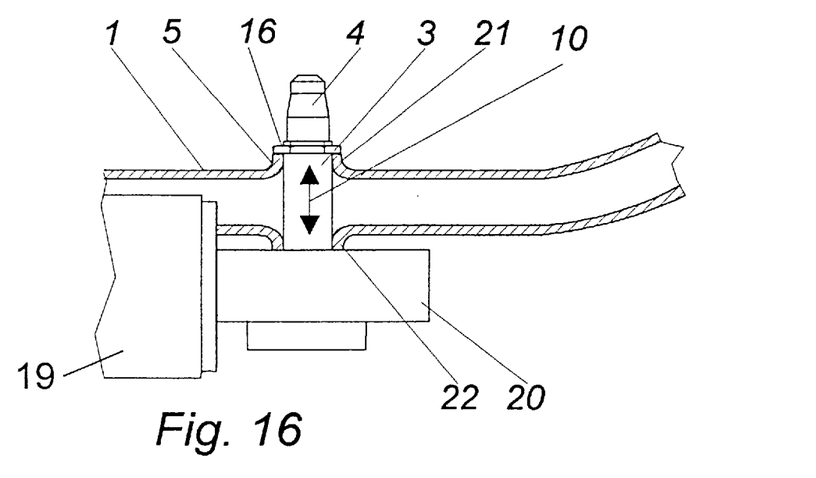
FIG. 16 is a view showing a wiper drive fixed with a sleeve nut.

In FIG. 16 the bearing support 3 is axially fixed with a sleeve nut 16. It is screwed after the insertion of the bearing support 3 into the tubular element 5 from above on the bearing tube 3, is supported on the upper collar 21 of the tubular element 5, and pulls the bearing tube 3 from below into the tubular element 5. The transmission 20 is supported then on the lower collar 22.

Figure 17:
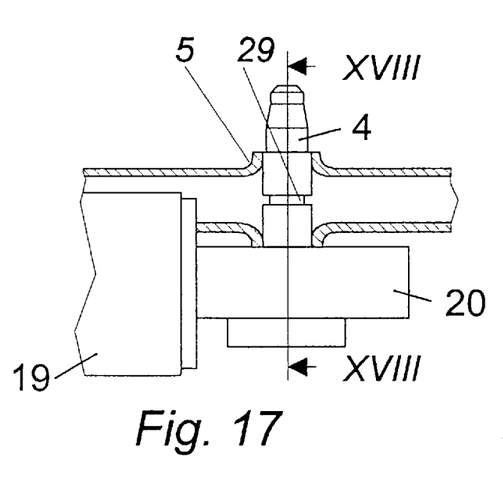
FIG. 17 is a view showing a wiper drive fixed by a deformation.
Figure 18:
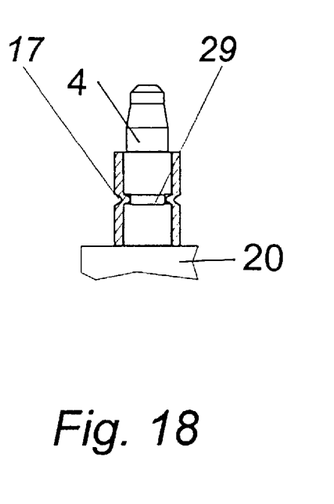
FIG. 18 is a view showing a section taken along line XVIII—XVIII in FIG. 17.

As shown in FIG. 17 and 18, the bearing support 3 can be fixed in the axial direction 10 by a deformation 17 of the tubular element 5. This is obtained by providing the bearing support 3 with a groove 29, in which the tubular element 5 is impregnated or pressed. This is performed for example 90° to the longitudinal direction of the tubular plate 1.

In the example of FIGS. 1 and 2, the connection between the tubular support 3 and the tubular element 5 is used for at least one further mounting point 18 on the adjoining component. Preferably, the mounting point 18 is additionally mounted on the transmission 20. At the end side 30 of the transmission 20, a pin 31 is arranged and formed for example by a material-non removing and material-removing deformation, or is welded, plugged etc. An angular plate 32 is supported on the pin 31 through a buffer 33. The buffer 33 is mounted in a recess 34 of the angular plate 32 and is plugged with a hole 35 on the pin 31. An end 36 of the angular plate 32 which faces the transmission 20 and is angled, is screwed or welded with an adjoining component, for example a vehicle chassis. The additional mounting element 18 provides a rigid support. The buffer 33 dampens vibrations and oscillations.

It will be understood that each of the elements described above, or two or more together, may also find a useful application in other types of constructions differing from the types described above.

While the invention has been illustrated and described as embodied in wiper drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wiper device, comprising a tubular plate; a wiper drive mounted on said plate and having a drive shaft; a bearing support in which said drive shaft is guided; and a tubular element arranged on said tubular plate so that said wiper drive with said bearing support is inserted in said tubular element, said bearing support being plugged with the tubular plate.

2. A wiper device as defined in claim 1, wherein said tubular element is formed on said tubular plate.

3. A wiper device as defined in claim 1, wherein said tubular element is formed as a mandrel-calibrated tubular element.

4. A wiper device as defined in claim 1, wherein said tubular element and said bearing support are connected with one another by at least one further mounting point on an adjacent component.

5. A wiper device as defined in claim 4, wherein said at least one mounting point on an adjacent component is integrated with said wiper drive.

6. A wiper device, comprising a tubular plate; a wiper drive mounted on said plate and having a drive shaft; a bearing support in which said drive shaft is guided; and a tubular element arranged on said tubular plate so that said wiper drive with said bearing support is inserted in said tubular element, said wiper drive being fixed in a peripheral direction by a force-transmitting connection between said bearing support and said tubular element.

7. A wiper device, comprising a tubular plate; a wiper drive mounted on said plate and having a drive shaft; a bearing support in which said drive shaft is guided; and a tubular element arranged on said tubular plate so that said wiper drive with said bearing support is inserted in said tubular element, said wiper drive being fixed in a peripheral direction by a form-locking connection between said bearing support and said tubular element.

8. A wiper device as defined in claim 7, wherein said tubular element has an inner contour which deviates from a circular shape while said bearing support has a corresponding outer contour.

9. A wiper device as defined in claim 8, wherein said inner contour of said tubular element and said outer contour of said bearing support is polygonal.

10. A wiper device as defined in claim 9, wherein said inner contour of said tubular element and said outer contour of said bearing support is non-round.

11. A wiper device as defined in claim 9, wherein a toothing is provided between said bearing support and said tubular element.

12. A wiper device, comprising a tubular plate; a wiper drive mounted on said plate and having a drive shaft; a bearing support in which said drive shaft is guided; and a tubular element arranged on said tubular plate so that said wiper drive with said bearing support is inserted in said tubular element, a contour between said bearing support and said tubular element being conical in a longitudinal direction.

13. A wiper device, comprising a tubular plate; a wiper drive mounted on said plate and having a drive shaft; a bearing support in which said drive shaft is guided; and a tubular element arranged on said tubular plate so that said wiper drive with said bearing support is inserted in said tubular element, a contour between said bearing support and said tubular element being stepped in a longitudinal direction.

14. A wiper device, comprising a tubular plate; a wiper drive mounted on said plate and having a drive shaft; a bearing support in which said drive shaft is guided; and a tubular element arranged on said tubular plate so that said wiper drive with said bearing support is inserted in said tubular element, said wiper drive having at least one bracket mounted on said tubular plate so as to clamp said tubular plate and said wiper drive.

15. A wiper device, comprising a tubular plate; a wiper drive mounted on said plate and having a drive shaft; a bearing support in which said drive shaft is guided; and a tubular element arranged on said tubular plate so that said wiper drive with said bearing support is inserted in said tubular element, said wiper drive being connected by at least one screw with said tubular plate, said screw extending through said tubular plate.

16. A wiper device, comprising a tubular plate; a wiper drive mounted on said plate and having a drive shaft; a bearing support in which said drive shaft is guided; and a tubular element arranged on said tubular plate so that said wiper drive with said bearing support is inserted in said tubular element, said bearing support being form-lockingly fixed in said tubular element in an axial direction.

17. A wiper device as defined in claim 16, wherein said bearing support is provided with a sleeve nut which fixes said bearing support in an axial direction relative to said tubular element.

18. A wiper device as defined in claim 16, wherein said bearing support is fixed by a deformed portion of said tubular element.

19. A wiper device, comprising a tubular plate; a wiper drive mounted on said plate and having a drive shaft; a bearing support in which said drive shaft is guided; and a tubular element arranged on said tubular plate so that said wiper drive with said bearing support is inserted in said tubular element, said bearing support being fixed in an axial direction with a safety ring.

\* \* \* \* \*